United States Patent [19]

Moran

[11] Patent Number: 4,950,916

[45] Date of Patent: Aug. 21, 1990

[54] LINE VOLTAGE REGULATOR

[75] Inventor: Steven A. Moran, Mt. Lebanon, Pa.

[73] Assignee: Westinghouse Electric Corp., Pittsburgh, Pa.

[21] Appl. No.: 236,429

[22] Filed: Aug. 25, 1988

[51] Int. Cl.[5] .......... G05F 1/68; H02J 3/18

[52] U.S. Cl. .......... 307/82; 307/86; 363/35; 323/210; 323/211

[58] Field of Search .......... 307/98, 99, 103, 105, 307/97, 102, 101, 104, 30-87, 112, 123; 323/218, 293, 205, 207, 209, 211, 210

[56] References Cited

U.S. PATENT DOCUMENTS

| | | | |
|---|---|---|---|
| 2,638,571 | 5/1953 | Schultz | 323/66 |
| 3,530,300 | 9/1970 | Gunther et al. | 307/33 |
| 3,757,202 | 9/1973 | Prouty et al. | 323/45 |
| 3,825,814 | 7/1974 | Pelly | 321/9 A |
| 3,825,815 | 7/1974 | Gyugyi et al. | 321/9 A |
| 4,177,389 | 12/1979 | Schott | 307/44 X |
| 4,178,539 | 12/1979 | Crapo | 323/45 |
| 4,251,735 | 2/1981 | Coleman | 307/66 X |
| 4,251,736 | 2/1981 | Coleman | 307/66 X |
| 4,276,590 | 6/1981 | Hansel et al. | 307/82 X |
| 4,307,442 | 12/1981 | Yano et al. | 323/207 X |
| 4,320,444 | 3/1982 | Hausler et al. | 363/35 |
| 4,357,545 | 11/1982 | Le Grand et al. | 307/86 X |
| 4,417,196 | 11/1983 | Cueto et al. | 323/210 |
| 4,418,380 | 11/1983 | Tanaka et al. | 323/207 X |
| 4,472,674 | 9/1984 | Yano et al. | 323/210 |
| 4,529,925 | 7/1985 | Tanaka et al. | 323/211 X |
| 4,560,917 | 12/1985 | Gyugyi | 323/210 |
| 4,565,958 | 1/1986 | Cooper | 323/248 |
| 4,621,198 | 11/1986 | Roberge et al. | 307/82 |
| 4,651,265 | 3/1987 | Stacey et al. | 363/35 |
| 4,694,193 | 9/1987 | Schlenk et al. | 307/66 X |

FOREIGN PATENT DOCUMENTS 1026278 6/1983 U.S.S.R. .

*Primary Examiner*—William M. Shoop, Jr.
*Assistant Examiner*—Paul Ip

[57] ABSTRACT

The present invention pertains to a line voltage regulator for a cable which is electrically connected to at least one load. The line voltage regulator includes a device for producing a cable voltage drop signal that corresponds to a voltage drop across the cable which separates the line voltage regulator and the load. The line voltage regulator also includes a sensor circuit for determining distortion voltage across the cable which separates the power supply and the line voltage regulator and the fundamental frequency signal required for regulation. The sensor circuit produces a drive signal that corresponds to the distortion voltage and the fundamental frequency signal required for regulation. Additionally, there is a device for providing voltage to the cable such that the voltage is regulated and distortion voltage across the cable is essentially eliminated as applied to the load. The device for providing voltage is electrically connected to the sensor circuit and controlled by the drive signal therefrom. The cable voltage drop signal producing device provides the cable voltage drop signal to the sensor circuit. The sensor circuit adds a cable voltage drop signal to the distortion voltage and the fundamental voltage that the sensor circuit has identified and produces the drive signal that is used to control the device for providing voltage to the cable. The voltage providing device provides voltage to the cable such that the voltage in the cable is regulated and distortion voltage in the cable is essentially eliminated as applied to the load.

5 Claims, 2 Drawing Sheets

LINE VOLTAGE REGULATORcl FIELD OF THE INVENTION

The present invention relates to a line voltage regulator. More specifically, the present invention relates to a line voltage regulator that compensates for distortion voltage in a cable and a voltage drop across the cable.

BACKGROUND OF THE INVENTION

Commonly, an electrical load receives power from a remote power supply. A cable is used to electrically connect the power supply with the load in order for the current from the power supply to reach the load. When the current is AC (alternating current) the ideal waveform of the voltage is essentially sinusodial with a desired amplitude at the load. However, the use of a cable to electrically connect the power supply and the load results in a voltage drop across the cable due to the impedance of the cable. Existing line voltage regulators compensate for this voltage drop that exists across the cable typically by sensing the voltage drop across the cable at the load and subtracting the voltage drop from the voltage regulator output voltage feedback signal. In this way a desired voltage is provided at the load and the voltage is considered regulated.

Moreover, if the load is nonlinear, distortion voltage, which is also known as the harmonic part of the voltage, is introduced into the voltage provided by the power supply at the load and distorts the sinusodial waveform. Heretofore, there are no line voltage regulators that compensate for the distortion voltage in the cable as well as provide voltage regulation in order to insure a voltage with the proper amplitude is received by the load.

The present invention compensates for the harmonic voltage drop across the cable which separates the line voltage regulator and the load by predistorting the voltage at the output of the regulator by the same amount as the voltage drop across the cable, but with opposite polarity and without sensing the voltage at the load. The present invention also compensates for the fundamental voltage drop across the cable and regulates the voltage as applied to a load. Therefore, the resulting voltage is distortion free as well as regulated as applied to the load and requires no sensing of the voltage at the load.

SUMMARY OF THE INVENTION

The present invention pertains to a line voltage regulator for a cable which is electrically connected to at least one load. The line voltage regulator is comprised of means for producing a cable voltage drop signal that corresponds to a voltage drop across the cable which separates the line voltage regulator and the load. The line voltage regulator is also comprised of a sensor circuit for determining the harmonic voltage dropped across the cable which separates the power supply and the line voltage regulator. The sensor circuit produces a composite drive signal that corresponds to this distortion voltage plus a fundamental frequency drive signal such that the line voltage regulator output voltage is regulated. To this drive signal is added the signal which corresponds to the voltage drop across the cable which separates the line voltage regulator and the load. Additionally, there is means for providing voltage to the cable such that the voltage is regulated and distortion voltage is essentially eliminated as applied to the load.

The means for providing voltage is electrically connected to the sensor circuit and controlled by the composite drive signal therefrom.

The cable voltage drop signal producing means provides the cable voltage drop signal to the sensor circuit which corresponds to the voltage drop across the cable that separates the line voltage regulator and the load. The sensor circuit adds the cable voltage drop signal to the signal corresponding to the harmonic voltage dropped across the cable which separates the power supply and the line voltage regulator. Finally, a fundamental frequency signal is added such that the line voltage regulator output voltage is regulated. The resulting signal is the composite drive signal which is used to control the means for providing voltage to the cable. The voltage providing means provides voltage to the cable such that the voltage at the end of the cable is regulated and distortion voltage in the cable is essentially eliminated as applied to the load.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
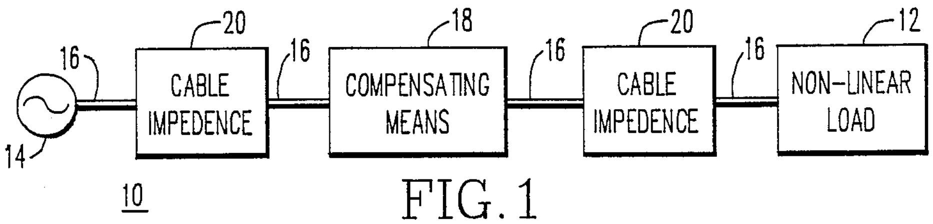
FIG. 1 is a schematic diagram of an electrical distribution system having the present invention.
Figure 2:
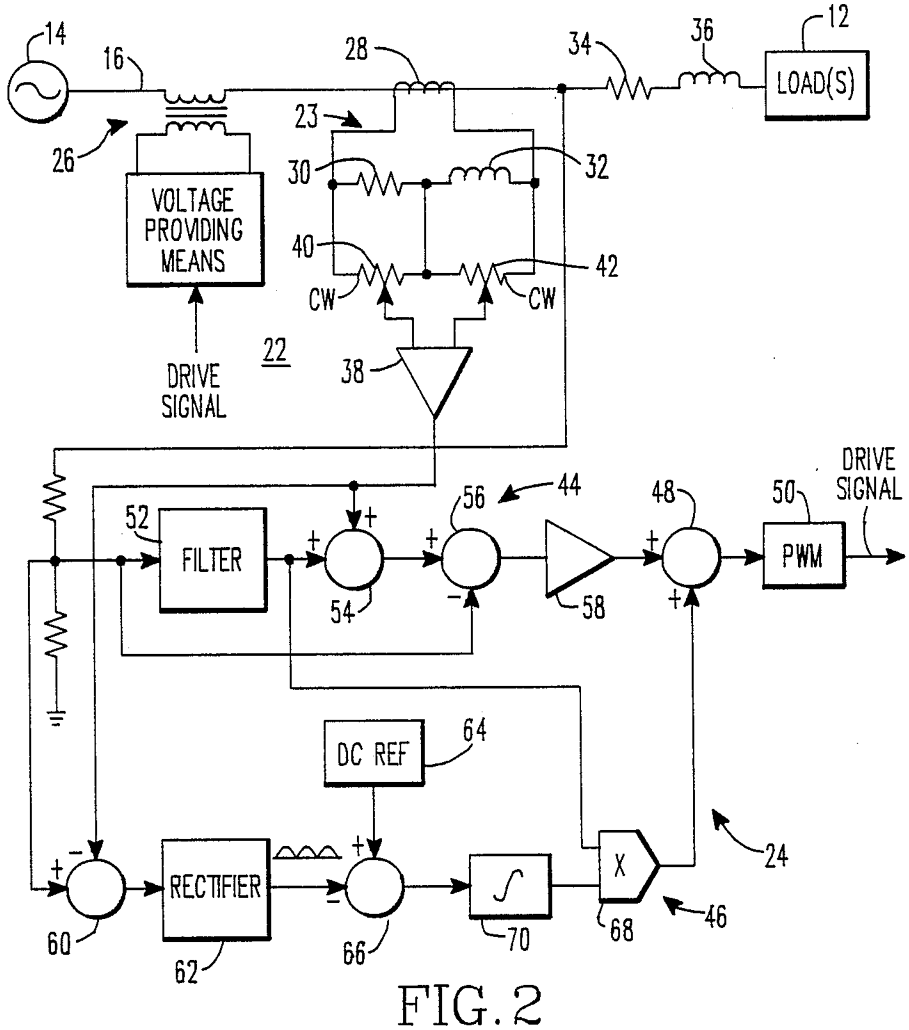
FIG. 2 is a schematic diagram of a line voltage regulator.

Referring now to the drawings, wherein like reference numerals designate identical or corresponding parts throughout the several views, and more particularly to FIG. 1 thereof, there is shown a schematic diagram of an electrical distribution system 10. The electrical distribution system 10, preferably an AC distribution system, is comprised of at least one electrical load 12 which can be a nonlinear load, a power supply 14 remote from the nonlinear load 12 that provides current thereto, and a cable 16 which is electrically connected to the nonlinear load 12 at one end and the power supply 14 at the other end. The cable 16 allows current provided by the power supply 14 to flow to the nonlinear load 12. Additionally, there is means 18 for compensating for voltage distortion in the cable 16 and for a voltage drop across the cable 16 such that a regulated voltage is provided to the nonlinear load 12. The voltage drop across the cable 16 is due to the cable impedance 20 and the distortion voltage in the cable is normally caused by the nonlinear load 12. The compensating means 18 is electrically connected to the cable 16. Preferably, the compensating means 18 is a line voltage regulator 22 as shown in FIG. 2.

The line voltage regulator 22 preferably is comprised of means 23 for producing a cable voltage drop signal that corresponds to the voltage drop across the cable 16 which separates the line voltage regulator and the load. The line voltage regulator 22 also is comprised of a sensor circuit 24. The sensor circuit 24 determines the harmonic voltage dropped across the cable which separates the power supply 14 from the line voltage regulator and produces a drive signal that corresponds to this distortion voltage. In addition, the sensor circuit produces a fundamental frequency drive signal such that the line voltage regulator output voltage is regulated. To this drive signal is added the signal which corresponds to the voltage drop across the cable which separates the line voltage regulator and the load to produce a composite drive signal. The line voltage regulator 22 is also comprised of means 26 for providing voltage to the cable 16 such that the voltage is regulated and distortion voltage in the cable 16 is essentially eliminated as applied to the nonlinear load 12. The means 26 for providing voltage to the cable is electrically connected to the sensor circuit 24 and is controlled by the composite drive signal therefrom. The means 26 for providing voltage to the cable 16 can be a zone filter less a sensor circuit thereof. Such a zone filter is completely described in Westinghouse Electric Case 53,288 and is a related invention hereto.

The cable voltage drop signal producing means 23 preferably includes a first transformer 28 electrically connected to the cable 16 for measuring the current therein and producing a secondary current corresponding thereto. A first resistor 30 is electrically connected to the first transformer 28 and is capable of receiving the secondary current therefrom. The cable voltage drop signal producing means 23 also includes a first inductor 32 which is electrically connected in series with the first resistor 30, and electrically connected to the first transformer 28 such that the first inductor 32 is capable of receiving the secondary current therefrom. The first inductor 32 and the first resistor 30 have a voltage drop thereacross due to the secondary current. The first resistor 30 and the first inductor 32 together represent and correspond to the cable impedance 20 of the cable 16. The actual cable impedance 20 can be represented by cable resistance 34 and cable inductance 36. The voltage drop across the first resistor 30 and the first inductance 32 is proportional to the voltages developed across the cable resistance 34 and the cable inductance 36 of the cable 16. The first resistor 30 produces a cable resistance voltage signal and the first inductor produces a cable inductance voltage signal. A differential amplifier 38 is electrically connected to the first resistor 30 and the first inductor 32 for producing the cable voltage drop signal corresponding to the sum of the cable inductance voltage signal and the cable resistance voltage signal.

In a preferred embodiment, the first resistor 30 and the first inductor 32 represent the cable resistance 34 and the cable inductance 36, respectively, associated with a maximum cable length. In order to calibrate the line voltage regulator 22 for use in a cable 16 that is less than the maximum cable length, a first potentiometer 40 and a second potentiometer 42 in series with the first potentiometer 40 can be electrically connected in parallel with the first resistor 30 and the first inductor 32. The first potentiometer 40 and the second potentiometer 42 receive the cable resistance voltage signal and the cable inductance voltage signal, respectively, and provide a specific cable resistance voltage signal- and a specific cable inductance voltage signal, respectively, to the differential amplifier 38 that corresponds to the specific length of the cable 16. The differential amplifier 38 then produces a cable voltage droP signal which corresponds to the sum of the specific cable resistance voltage signal and the specific cable inductance voltage signal.

The sensor circuit 24 preferably includes means 44 for producing a harmonic and drop voltage signal corresponding to the distortion voltage across the cable 16 which separates the power supply 14 and the line voltage regulator and the voltage drop across the cable 16 which separates the line voltage regulator and the load. Sensor circuit 24 also includes means 46 for producing a fundamental frequency signal required for regulation of the output voltage. Additionally, there is included a first adder 48 for adding the harmonic and drop voltage signal, and the fundamental voltage signal together and producing a distortion, fundamental and drop voltage signal corresponding thereto. Electrically connected to the first adder 48 is a pulse width modulator 50. The pulse width modulator 50 produces the drive signals corresponding to the distortion, fundamental and drop voltage signal received from the first adder 48. The pulse width modulator 50 is also electricallY connected to the means 26 for providing voltage to the cable. The drive signals produced by the pulse width modulator 50 control the means 26 for providing, voltage to the cable 16.

The harmonic and drop voltage signal producing means 44 preferably includes a bandpass filter 52 electrically connected to the cable 16 at the output of the line voltage regulator. The bandpass filter 52 removes the distortion voltage received from the cable 16 and produces a fundamental form voltage signal corresponding to the fundamental voltage of the cable. The harmonic and drop voltage signal producing means 44 also includes a second adder 54 which is electricallY connected to the bandpass filter 52 and to the differential amplifier 38. The second adder 54 produces a fundamental and drop voltage signal corresponding to the sum of the cable voltage drop signal and the fundamental form voltage signal.

There is also a first subtractor 56 electrically connected to the second adder 54 and the cable 16. The first subtractor 56 produces the harmonic and drop voltage signal corresponding to the difference between the fundamental and drop voltage signal and the cable voltage signal. The first subtractor 56 is also electrically connected to the first adder 48 for providing the harmonic and drop voltage signal thereto.

Preferably, an amplifier 58 is electrically connected between the first subtractor 56 and the first adder 58. The amplifier 58 receives the harmonic and drop voltage signal from the first subtractor 56 and amplifies the harmonic and drop voltage signal which is then provided to the first adder 48.

The means 46 for producing the fundamental voltage signal includes a second subtractor 60 electrically connected to the cable 16 downstream from where voltage is provided to the cable 16 by the voltage providing means 26. The second subtractor 60 is also electrically connected to the differential amplifier 38 of the cable voltage drop signal producing means 24. The second subtractor 60 produces a drop free voltage signal that corresponds to the difference between the cable voltage drop signal and the cable voltage signal.

The fundamental voltage signal producing means 46 also includes a rectifier 62 which is electrically connected to the second subtractor 60. The rectifier 62 produces a rectified drop free voltage signal. There is additionally included a DC voltage reference 64. The DC voltage reference 64 corresponds to the desired output AC voltage.

A third subtractor 66 is electrically connected to the DC voltage reference 64 and to the rectifier 62. The third subtractor 66 produces a voltage signal that corresponds to the difference between the DC reference signal and the rectified drop free voltage signal. The resulting signal is amplified and filtered, preferably using an integrator 70.

The fundamental voltage signal producing means 46 includes a multiplier 68 electrically connected to the third subtractor 66 and the bandpass filter 52. The multiplier 68 produces the fundamental voltage signal that corresponds to the integrator output and the fundamental form voltage signal.

In the operation of the preferred embodiment, the first potentiometer 40 and second potentiometer 42 are set to a desired position to correspond to a specific length of cable that is being used to electrically connect the load 12 with the power supply 14. If the cable 16 is a maximum length cable whose cable inductance 36 and cable resistance 34 corresponds to the first inductance of the first inductor 32 and the resistance of the first resistor 30, then the potentiometers are both set at the CW position so no modification of the voltage drop across the first resistor 30 and the first inductor 32 is caused by the potentiometers.

Figure 3:
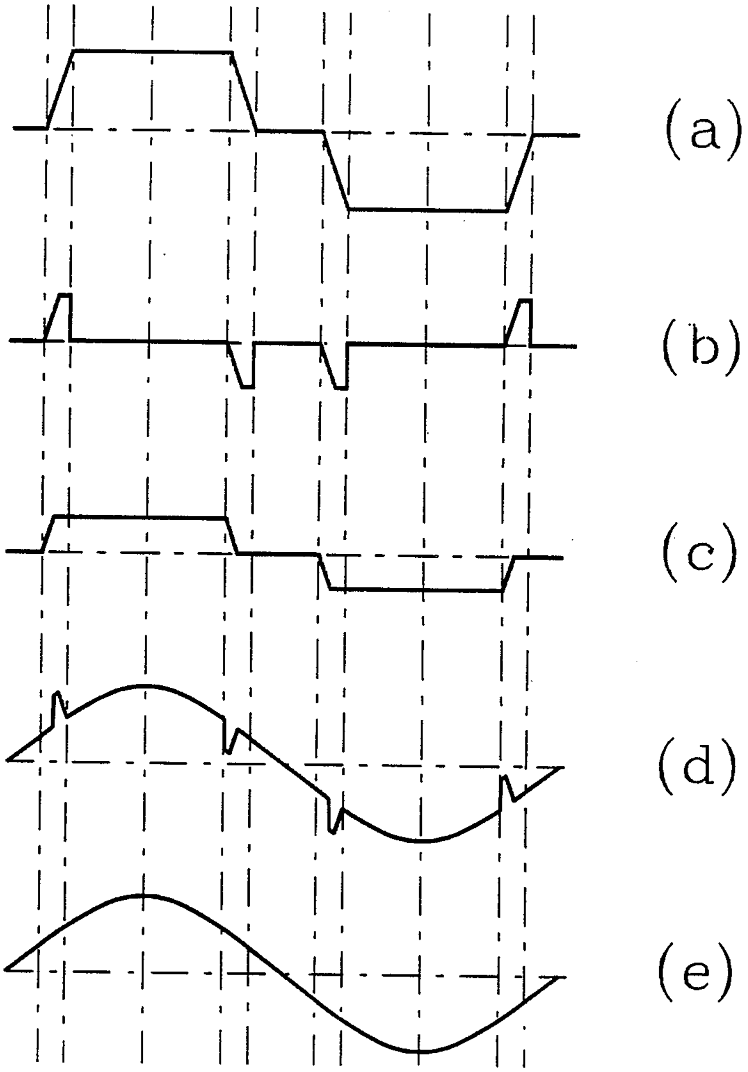
FIGS. 3*a* through 3*e* are current or voltage graphs which are not to scale.

After the first and second potentiometers 40, 42 are calibrated and the power supply 14 begins operating, the first transformer 28 senses the load current through the cable 16. (FIG. 3*a* depicts a possible load current that travels through the cable 16. FIGS. 3*b* and 3*c* depict the corresponding voltage component drop across the cable 16 due to the cable inductance and cable resistance, respectively.) A secondary current is produced by transformer 28 corresponding to the load current passing through the cable 16. The secondary current from the first transformer 28 causes a voltage drop across the first resistor 30 and first inductor 32. The first resistor 30 and first inductor 32 produce a cable resistance voltage signal and a cable inductance voltage signal, respectively. The first potentiometer 40 and second potentiometer 42 receive the cable resistance voltage signal and the cable inductance voltage signal, respectively, and provide a specific cable resistance voltage signal and a specific cable inductance voltage signal, respectively, which are received by a differential amplifier 38. The differential amplifier 38 produces the cable voltage drop signal corresponding to the sum of the specific cable inductance voltage signal and the specific cable resistance voltage signal.

At the same time, a bandpass filter 52 receives a cable voltage signal from the cable 16 and produces a fundamental form voltage signal corresponding to the fundamental voltage of the cable. The fundamental form voltage signal from the bandpass filter 52 is received by the second adder 54. The second adder 54 also receives the cable voltage drop signal and produces a fundamental and drop voltage signal which corresponds to the sum of the cable voltage drop signal and the fundamental form voltage signal. A first subtractor 56 receives the fundamental and drop voltage signal from the second adder 54 and the cable voltage signal and produces a harmonic and drop voltage signal corresponding to the difference between the fundamental and drop voltage signal and the cable voltage signal. Thus, by subtracting the cable voltage signal from the fundamental and drop voltage signal, the fundamental part of both these signals cancel and what remains is only the distortion voltage and the cable drop voltage signal. An amplifier 58 then boosts the gain of the harmonic and drop voltage signal which is received by a first adder 48.

A second subtractor 60 receives the cable voltage drop signal from the differential amplifier 38, and the cable voltage signal from the cable 16 at a point downstream from where voltage is provided to the cable by the voltage providing means 26. The second subtractor 60 produces a drop free voltage signal that corresponds to the difference between the cable voltage drop signal and the cable voltage. The second subtractor 60 serves to remove that portion of the voltage that was provided to the cable 16 by the voltage providing means 26 in order for the voltage drop across the cable 16 to be compensated. By removing the portion of the voltage provided to the cable 16 that corresponds to the cable voltage drop signal (the cable voltage drop signal is added to the second adder 54 and is a part of the drive signal that is used to control the voltage providing means 26), the voltage that is in the cable 16 before it is modified by the voltage producing means 26 is realized. This drop free voltage signal, which essentially represents the true cable voltage without any modifications, is received by the rectifier 62.

The rectifier 62 produces a rectified signal corresponding to the amplitude of the drop free voltage signal. A third subtractor 66 receives the rectified voltage signal and a DC voltage reference signal from a DC voltage reference 64 and produces a DC fundamental voltage signal. This DC fundamental voltage signal corresponds to the difference between the DC voltage reference signal and the rectified voltage signal. In other words, the DC fundamental voltage signal essentially corresponds to the difference between what the fundamental voltage should be with respect to the cable 16, and what it is with respect to the cable 16. An integrator 70 receives the DC fundamental voltage signal and integrates the DC fundamental voltage signal over time in order to amplify and filter the DC fundamental voltage signal. The amplified and filtered DC fundamental voltage signal is received by a multiplier 68 which also receives the fundamental form voltage signal from the high frequency bypass filter 52. The fundamental form voltage signal is an AC signal and when multiplied by the DC fundamental voltage signal produces the fundamental voltage signal that has the desired sine wave modulating waveform.

The adder 48 receives the fundamental voltage signal from the multiplier 68, and the harmonic and drop voltage signal from the amplifier 58 and produces a distortion, fundamental and drop voltage signal. This distortion, fundamental and drop voltage signal corresponds to the distortion voltage across the cable between the power supply 14 and the line voltage regulator, the fundamental voltage required for regulation and the voltage drop across the cable between the line voltage regulator and the load. The distortion, fundamental and drop voltage signal is provided to a pulse width modulator 50. The pulse width modulator 50 produces a drive signal corresponding to the distortion, fundamental and drop voltage signal received from the first adder 48. The drive signal controls the voltage providing means 26 and increases the voltage at the output of the line voltage regulator such that the voltage across the cable 16 between the line voltage regulator and the load is compensated for and the voltage applied to the load is distortion-free as well as regulated. See FIG. 3*d* which shows the output voltage of the voltage providing means 26 with respect to the load current depicted in FIG. 3a. Consequently, the voltage at the nonlinear load 12 is an undistorted sine wave, as shown in FIG. 3e, with respect to the load current shown in FIG. 3a. The voltage at the load 12 is then essentially distortion free as well as regulated and at a desired value.

Although the invention has been described in detail in the foregoing embodiments for the purpose of illustration, it is to be understood that such detail is solely for that purpose and that variations can be made therein by those skilled in the art without departing from the spirit and scope of the invention except as it may be described in the following claims.

What is claimed is:

1. A line voltage regulator for a cable in an A.C. distribution system electrically connected to at least one load, the line voltage regulator located remotely from the load, comprising:

a means for producing a cable voltage drop signal that corresponds to a voltage drop across the cable which separates the line voltage regulator and the load;

a sensor circuit for detecting distortion voltage across the cable which separates the means for producing a cable voltage drop signal and the load, said sensor circuit also producing a drive signal that corresponds to the distortion voltage, a fundamental voltage and the voltage drop in the cable; and a means for providing voltage to the cable between the power supply and the means for producing a cable voltage drop signal such that the voltage is regulated and distortion voltage in the cable is essentially eliminated as applied to the load, said means for providing voltage to the cable being electrically connected to the sensor circuit and controlled by the drive signal therefrom;

wherein the sensor circuit further comprises: (i) a means for producing a harmonic and drop voltage signal corresponding to the distortion voltage and the voltage drop across the cable; (ii) a means for producing a fundamental voltage signal corresponding to the fundamental voltage in the cable; (iii) a first adder for adding the harmonic and drop voltage signal, and the fundamental voltage signal together and producing a distortion, fundamental and drop voltage signal corresponding thereto; and (iv) a pulse width modulator electrically connected to the first adder and to the means for providing voltage to the cable, said pulse width modulator producing the drive signal corresponding to the distortion, fundamental and drop voltage signal received form the first adder which controls the means for providing voltage to the cable.

2. A line voltage regulator as described in claim 1 wherein the producing means includes:

a first transformer electrically connected to the cable for measuring the current therein and producing a secondary current corresponding thereto;

a first resistor electrically connected to the first transformer and receiving the secondary current therefrom, said resistor producing a cable resistance voltage signal;

a first inductor electrically connected in series with the first resistor, and electrically connected to the first transformer and receiving the secondary current therefrom, said first inductor producing a cable inductance voltage signal, said first inductor and said first resistor having a voltage drop thereacross due to the secondary current; and a differential amplifier electrically connected to the first resistor and first inductor for producing the cable voltage drop signal corresponding to the sum of the cable inductance voltage signal and the cable resistance voltage signal.

3. A line voltage regulator as described in claim 2 wherein the harmonic and drop voltage signal producing means includes a bandpass filter electrically connected to the cable for removing the distortion voltage received form the cable and producing a fundamental form voltage signal corresponding to the fundamental voltage of the cable;

a second adder electrically connected to the bandpass filter and to the differential amplifier for producing a fundamental and drop voltage signal corresponding to the sum of the cable voltage drop signal and the fundamental form voltage signal; and a first subtractor electrically connected to the second adder and the cable for producing the harmonic and drop voltage signal corresponding to the difference between the fundamental and drop voltage signal and the cable voltage signal, said first subtractor also electrically connected to the first adder.

4. A line voltage regulator as described in claim 3 wherein the means for producing a fundamental voltage signal includes a second subtractor electrically connected to the cable downstream from where voltage is provided tot he cable by the voltage providing means and electrically connected to the differential amplifier of the cable voltage drop signal producing means for producing a drop free voltage signal that corresponds to the difference between the cable voltage drop signal and the cable voltage;

a rectifier electrically connected to the second subtractor for producing a rectified voltage signal corresponding to the amplitude of the drop free voltage signal;

a DC voltage reference for producing a DC voltage reference signal corresponding to a desired AC output voltage;

a third subtractor electrically connected to the DC voltage reference and to the rectifier for producing a DC fundamental voltage signal that corresponds to the difference between the DC voltage reference signal and the rectified voltage signal; and a multiplier electrically connected to the third subtractor and the bandpass filter for producing the fundamental voltage signal that corresponds to the DC fundamental voltage signal and the fundamental form voltage signal, said multiplier also electrically connected to the first adder.

5. A line voltage regulator as described in claim 4 wherein the cable voltage drop signal producing means includes a first potentiometer and a second potentiometer in parallel with said first resistor and first inductor, and electrically connected to the first and second poententiometers providing a specific cable resistance voltage signal and a specific cable resistance voltage signal and a specific cable inductance voltage signal, respectively, to the differential amplifier, said differential amplifier producing the cable voltage drop signal corresponding to the sum of the cable resistance voltage signal, said differential amplifier also electrically connected to the second adder and to the second subtractor.

* * * * *